United States Patent [19]

Jones et al.

[11] Patent Number: 5,685,502
[45] Date of Patent: Nov. 11, 1997

[54] FILMSTRIP RECEIVING APPARATUS

[75] Inventors: Robert S. Jones; Douglas Joseph Pfaff, both of Rochester, N.Y.

[73] Assignee: Eastman Kodak Company, Rochester, N.Y.

[21] Appl. No.: 616,330

[22] Filed: Mar. 15, 1996

[51] Int. Cl.$^6$ ................................................ H04N 1/04
[52] U.S. Cl. .................... 242/348; 226/92; 358/496
[58] Field of Search .......................... 242/348, 348.3, 242/564.3, 566, 615.1, 615.3; 226/91, 92; 358/496, 498; 270/52.08; 271/186

[56] References Cited

U.S. PATENT DOCUMENTS

| | | | |
|---|---|---|---|
| 3,942,786 | 3/1976 | Lauren | 271/177 |
| 4,429,333 | 1/1984 | Davis et al. | 358/496 |
| 4,441,702 | 4/1984 | Nagel et al. | 271/177 |
| 4,613,222 | 9/1986 | Takase et al. | |
| 4,772,907 | 9/1988 | Marson . | |
| 5,012,346 | 4/1991 | DeJager et al. | 358/214 |
| 5,175,583 | 12/1992 | Noh et al. | 355/200 |
| 5,215,394 | 6/1993 | Kim | 400/625 |
| 5,244,294 | 9/1993 | Ewing | 400/625 |
| 5,249,793 | 10/1993 | Scheufler | 271/171 |
| 5,383,591 | 1/1995 | Thibert | 226/92 |
| 5,396,307 | 3/1995 | Pummell et al. . | |
| 5,461,492 | 10/1995 | Jones | 358/487 |
| 5,465,134 | 11/1995 | Palmer et al. | 242/348 |

*Primary Examiner*—John P. Darling
*Attorney, Agent, or Firm*—Gordon M. Stewart

[57] ABSTRACT

Filmstrip receiving apparatus for receiving an elongated filmstrip, comprising:
a) a housing defining a stationary exit chamber to receive the filmstrip therein, the housing having: two opposed side walls spaced apart to accommodate the width of the filmstrip; a transverse wall extending between the side walls from an upper front end of the chamber to a lower rear end of the chamber; and an upper opening and a rear opening;
b) a deflector mounted to reciprocate between forward and backward positions within the upper opening to define between said deflector and a front end of the upper opening, a filmstrip passage of variable length through which a filmstrip can lengthwise pass downwardly into the exit chamber.

A scanner apparatus for scanning image frames of a filmstrip advanced into a scanning station is also provided. Such a scanner has a scanner in the scanning station to scan the image frames of the filmstrip and derive image data related to the scanned image frame. The scanner is also provided with a filmstrip receiving apparatus of the invention.

16 Claims, 9 Drawing Sheets

FILMSTRIP RECEIVING APPARATUS

FIELD OF THE INVENTION

This invention relates to a filmstrip receiving apparatus which can particularly receive filmstrips from a scanner.

BACKGROUND OF THE INVENTION

Conversion of analog images into digital data has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

In order to perform line scanning of an image frame of photographic filmstrips, it is necessary to provide an accurate film transport mechanism to transport a filmstrip into a scanning gate and hold the image frame flat in alignment with a scanning aperture. Typically, the linear CCD array and scanning light beam are stationary so that the light beam illuminates a line of the filmstrip image frame, and a line of digitized data is stored. The scanning gate is incrementally moved line-by-line until the entire image frame is digitized. Than a new image frame is positioned and flattened for scanning and digitizing. Such a scanning and digitizing system for Photo-CD conversion is embodied in the KODAK® PIW Model 2400 Photo-CD scanner system marketed by the assignee of this application, as well as in allowed U.S. patent application Ser. No. 08/201,282, now U.S. Pat. No. 5,461,492, entitled "Film Scanner with In-Line Dual Scanning Gates". That application and all other references cited in the present application, are incorporated herein by reference.

In the KODAK® PIW Model 2400 Photo-CD scanner, the scanning plane is vertical and the stationary scanner components are oriented horizontally. A film is fed into a translation stage by a diverter. The translation stage advances the film scanning gate past the stationary scanner components in a first pass for scanning the clamped image frame at a low resolution sufficient to provide a video display of the image frame on a monitor for viewing by the operator. The color balance of the scanned and digitized image pixel date is automatically adjusted to the color balance characteristics of the video display. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean. After all image frames are scanned, the trailing end of the filmstrip is retracted from the chamber and advanced in the reverse direction into the scanning gate one frame at a time. Then each image frame is scanned at high resolution for digitizing the image as a field of data associated to the data derived in the low resolution scan of the same image frame. The filmstrip is transported out the exit of the translation stage by a diverter for removal by the operator when scanning of all frames is completed.

While such scanners function well, some types of filmstrips might not cleanly exit the translation stage upon completion of scanning. For example, the trailing edge of transversely curled film could hang on the exit of the diverter so as to prevent short lengths of filmstrip from exiting. Of course, any rubbing or other unintentional contact of an image area of a filmstrip with scanner components could reduce image quality. Furthermore, due to movement of the film gate during the scanning process, a fixed contact of the translation stay with a filmstrip exit tray is not desirable.

It would be desirable then, to provide a filmstrip receiving apparatus, and a scanner using such an apparatus, which is constructed to facilitate clean exit of a filmstrip from a scanner, including filmstrips with transverse or longitudinal curl, through which a filmstrip can pass with little or no contact of the image area with the receiving apparatus parts, and which conveniently retains scanned filmstrips for removal by a user.

SUMMARY OF THE INVENTION

The present invention provides a filmstrip receiving apparatus for receiving an elongated filmstrip. The apparatus comprises a housing defining a stationary exit chamber to receive the filmstrip therein. The housing has two opposed side walls spaced apart to accommodate the width of the filmstrip, a transverse wall extending between the side walls from an upper front end of the chamber to a lower rear end of the chamber, and an upper opening and a rear opening. The apparatus also has a deflector extending across the upper opening, and mounted to reciprocate between forward and backward positions within the upper opening to define between the deflector and a front end of the upper opening, a filmstrip passage of variable length through which a filmstrip can lengthwise pass downwardly into the exit chamber.

The present invention also provides a scanner apparatus for scanning image frames of a filmstrip advanced into a scanning station of the scanner, and which has a filmstrip receiving apparatus of the present invention to receive a filmstrip following scanning.

A filmstrip receiving apparatus of the present invention facilitate clean exit of a filmstrip from a scanner apparatus, including filmstrips with transverse or longitudinal curl. A filmstrip can pass through a filmstrip receiving apparatus of the present invention with little or no contact of the image area with the receiving apparatus parts. Furthermore, the apparatus can be conveniently used with a scanner apparatus having a translating gate, and also conveniently retains scanned filmstrips for ready removal by a user.

EMBODIMENTS OF THE INVENTION

In the present application, it will be understood that words such as "upper", "lower", "sideways" and similar words of direction, are used in a relative sense only. Such descriptions are the actual directions though in reference to the orientation in which it is contemplated the present invention will be used, although other orientations during use are possible.

A receiving apparatus according to the present invention preferably also has a resilient means (for example, a spring) for urging the deflector into the forward position. The deflector is preferably dimensioned to extend upward and forward of the filmstrip passage so that when a leading edge of the filmstrip is urged against a front end of the deflector as the filmstrip is being fed lengthwise downward toward the filmstrip passage, the deflector directs the filmstrip toward the filmstrip passage.

A diverter is also preferably provided as part of the receving apparatus. The diverter guides a filmstrip downwardly through the filmstrip passage into the exit chamber. The diverter has two opposed sides and a filmstrip exit guide between them, which may be formed of opposed channels in the sides, to receive and guide respective edges of the filmstrip downward and rearward from an inlet opening which can receive the filmstrip, to an outlet opening. The diverter is reciprocable between forward and rearward positions in unison with the deflector during which the outlet opening of the exit guide maintains its relative position forward of the deflector and above the filmstrip passage. In this manner filmstrip is directed downwardly toward the filmstrip passage during reciprocating motion of the deflector and diverter frame.

The diverter may particularly also have a roller to intermittently contact a filmstrip traveling in the guide between its edges, and urge the filmstrip downward and rearward, and a driver to rotate the roller. The roller is preferably mounted off axis so as to normally be out of contact with a filmstrip traveling in the exit guide, but is rotatable into intermittent contact to do the foregoing urging of the filmstrip downard and rearward.

The transverse wall of the exit chamber may include a guide member which extends curvedly downward and rearward from adjacent a front end of the filmstrip passage, then straight rearward to at least the rear opening of the housing. Such a guide member helps guide the filmstrip entering the filmstrip passage, downward and rearward. A front end of the guide member extends upwardly through the front end of the filmstrip passage then curves forward. A tongue may additionally usefully be provided which extends downward and rearward from the deflector at least part way toward the transverse wall, to direct lengthwise curled film urged against it from below, in a forward direction.

The diverter also preferably has a filmstrip input guide between the sides which extends downwardly and forwardly from an inlet opening to an outlet opening positioned above and adjacent the inlet opening of the exit guide, so that the filmstrip can be move forwardly through the input guide onto a track aligned with the exit guide, then move rearwardly into the exit guide.

Referring to the drawings, each of the filmstrips 2 has a predetermined width between longitudinal edges 4. Typical filmstrip widths (that is, the distance between opposed edges 4) are between 25 mm to 35 mm. Running lengthwise adjacent respective edges 4 are edge sections 5, each of which may optionally have a series of perforations 6 in a known manner. Filmstrips 2 each have an image area 8 which is the area in which an image on the filmstrip normally extends. Image area 8 has a width less than the width of filmstrip 2, and may be further divided longitudinally into a series of discrete image frames 10, each of which contains a single picture.

Figure 1A:
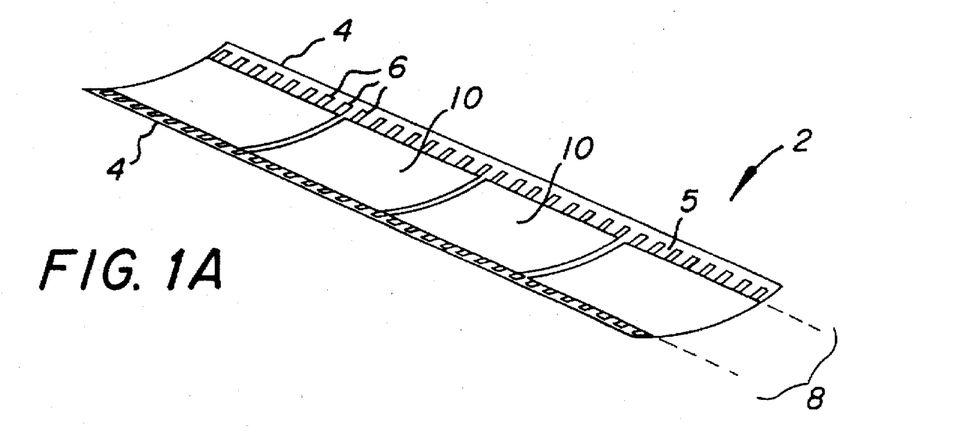
FIGS. 1A to 1E illustrate a filmstrip exhibiting various types of curls.
Figure 1B:
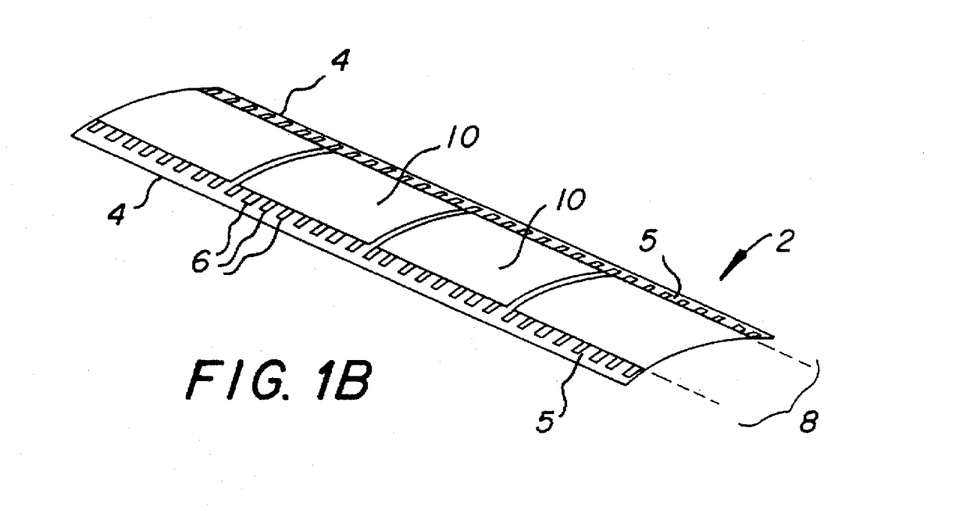
Figure 1C:
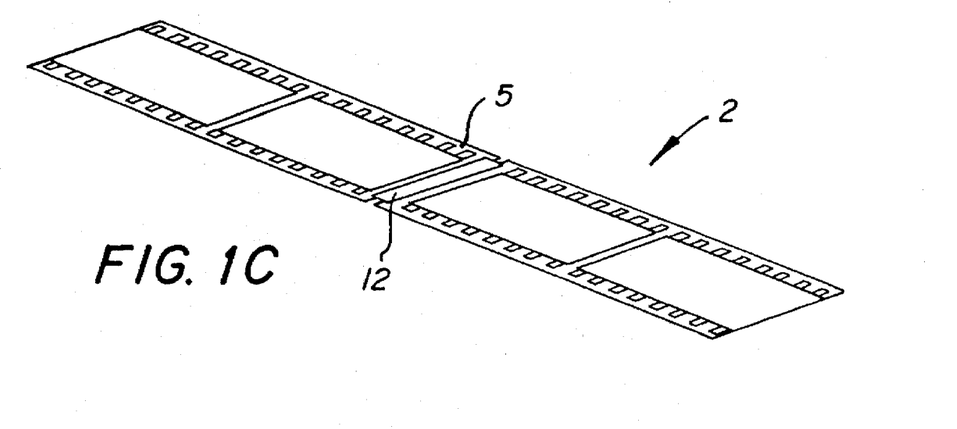
Figure 1D:
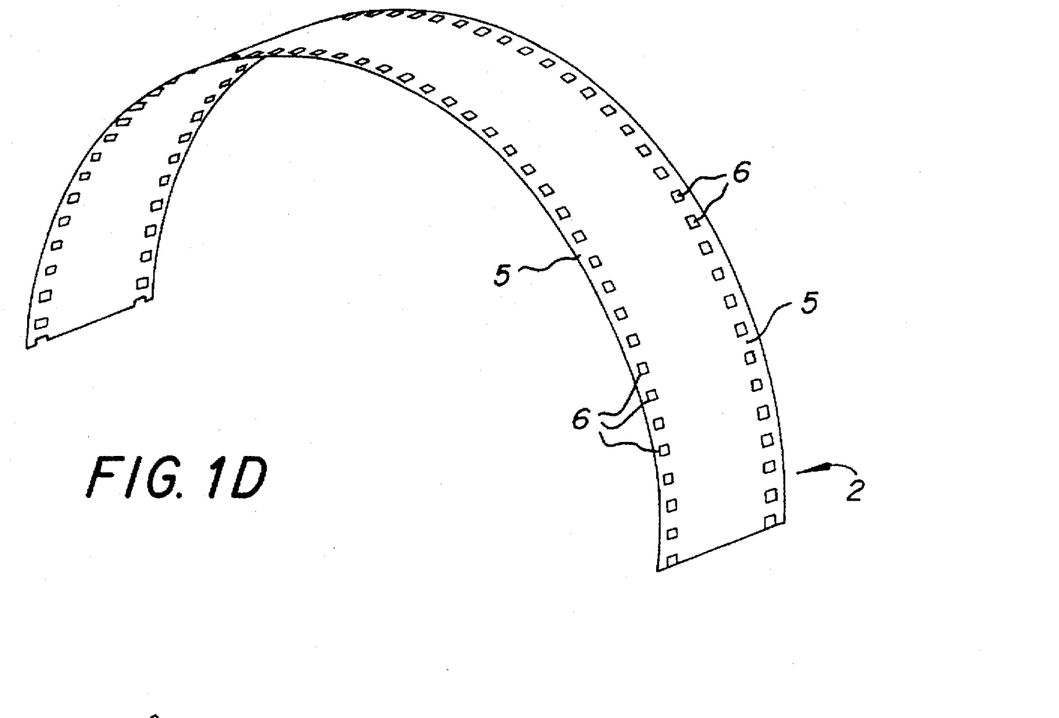
Figure 1E:
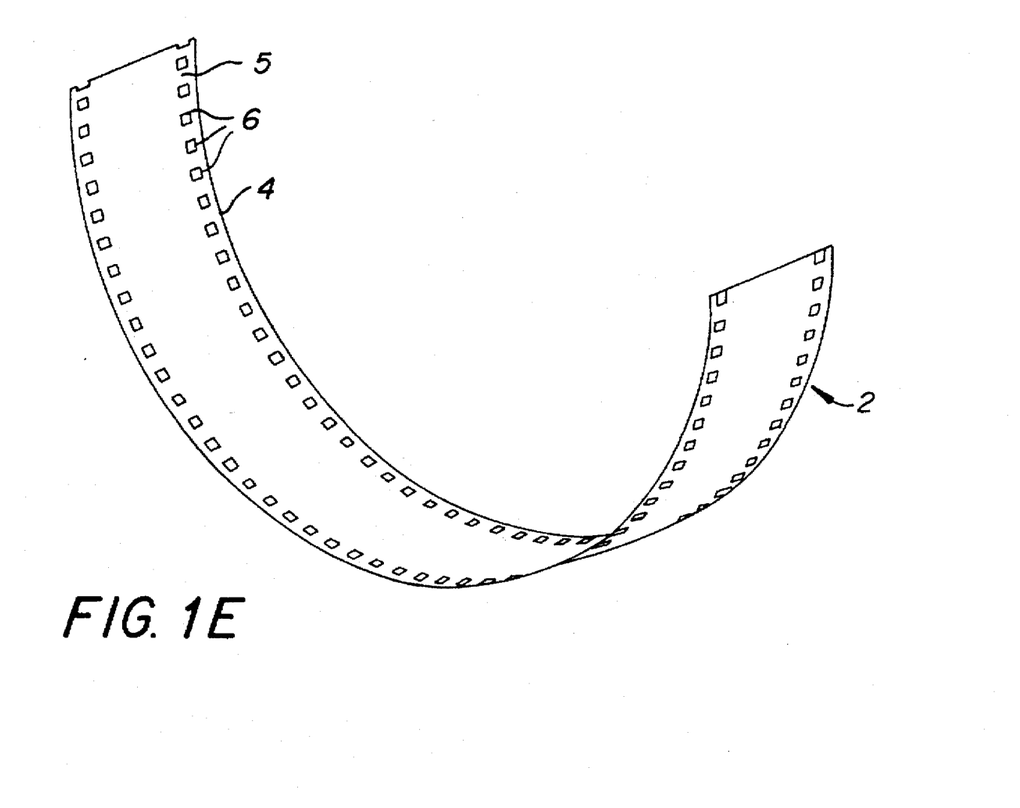
Figure 2:
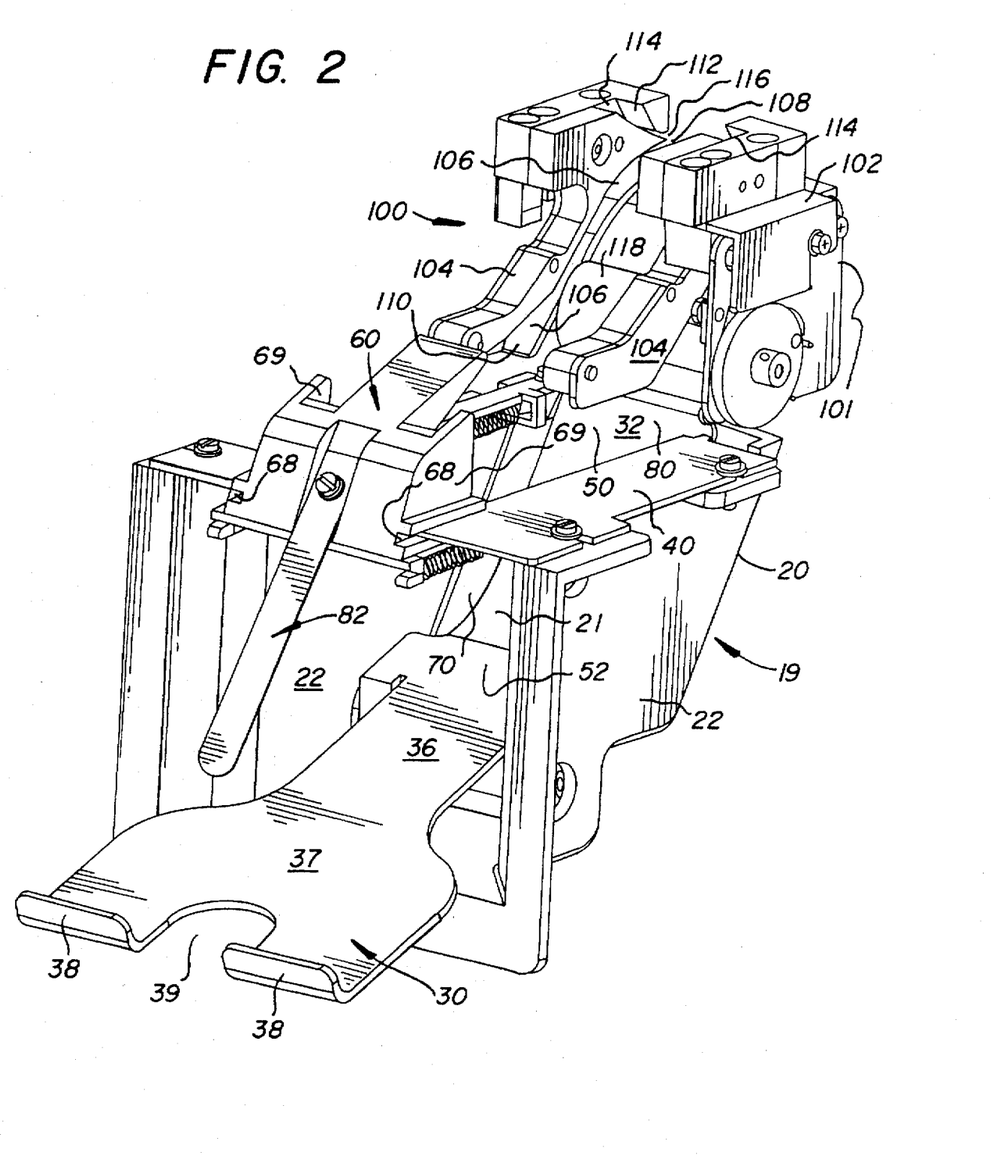
FIG. 2 is a perspective view of a filmstrip receiving apparatus of the present invention.
Figure 3:
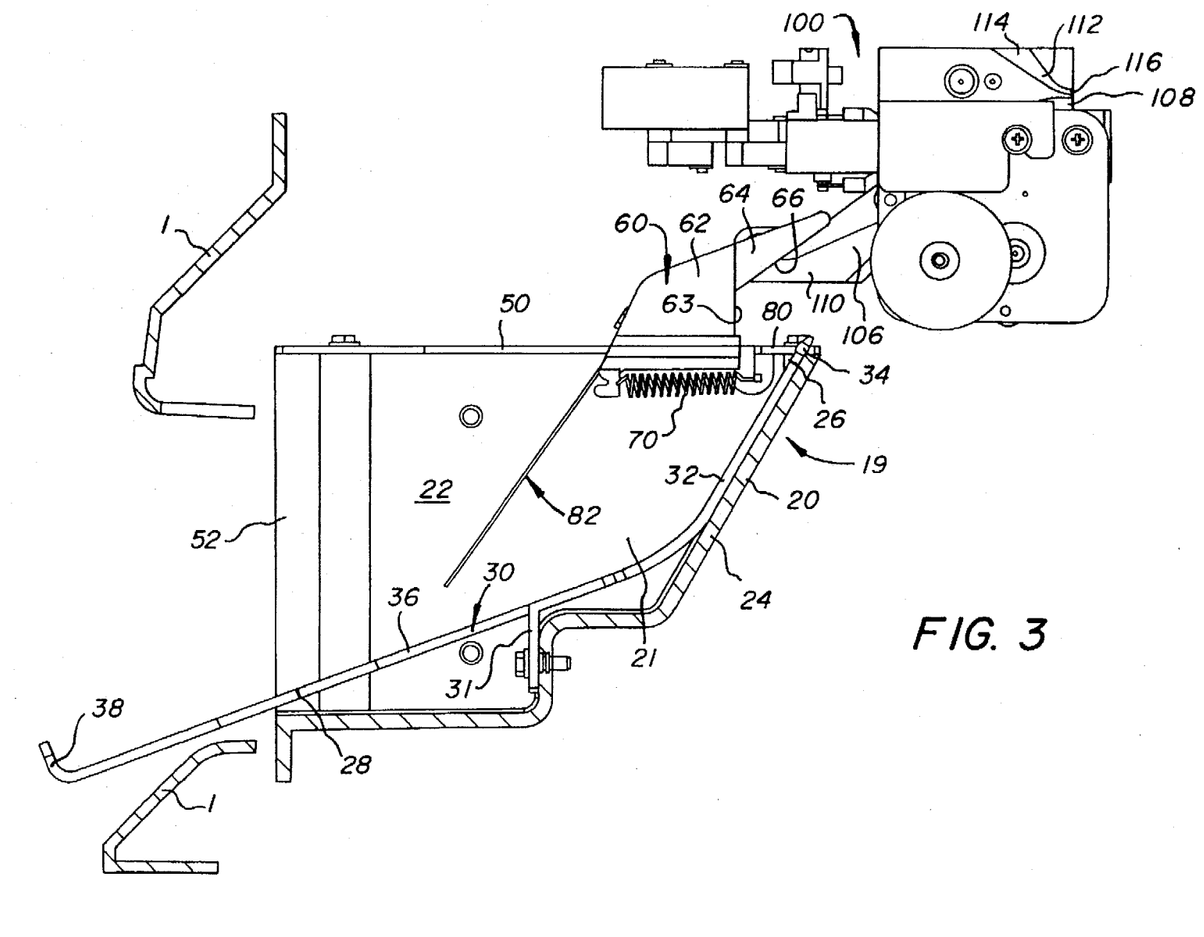
FIG. 3 is a vertical cross-section of the apparatus of FIG. 2 showing the deflector in a forward position.
Figure 4:
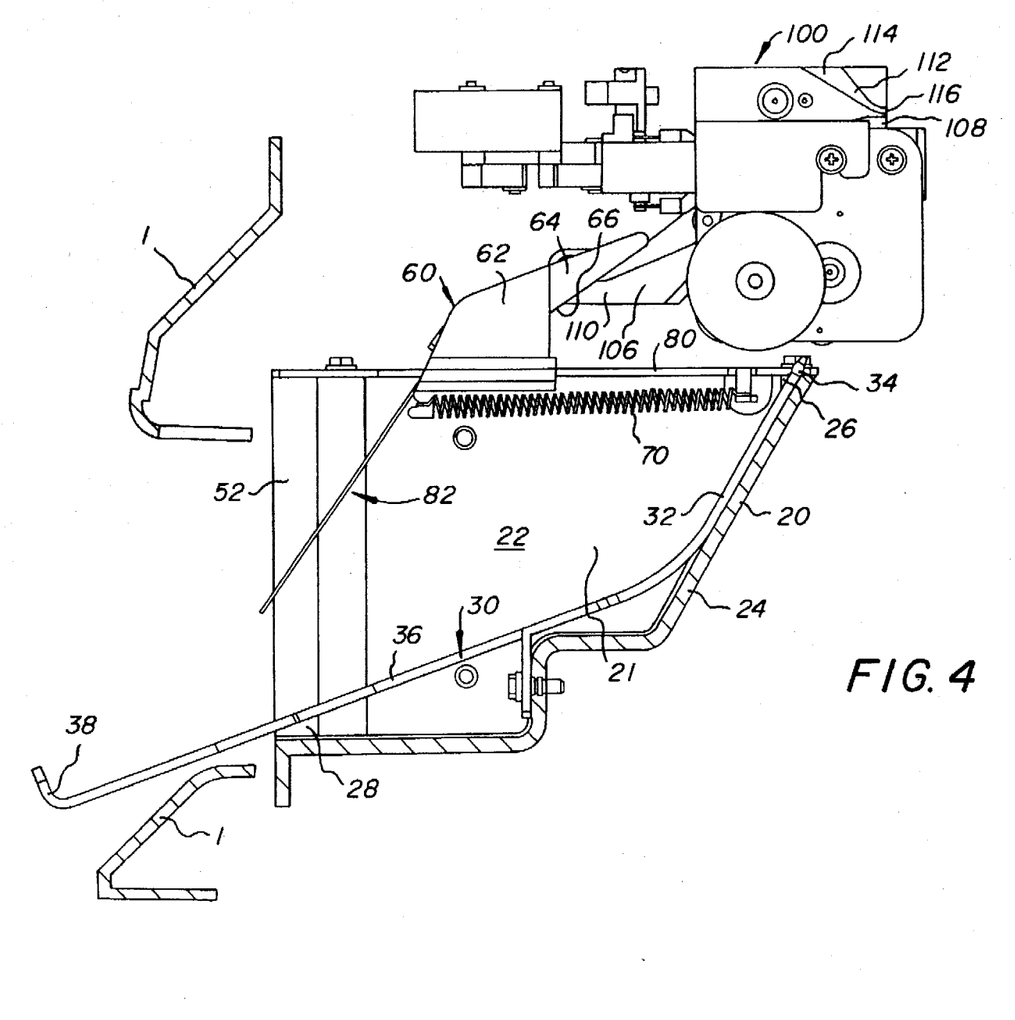
FIG. 4 is a view similar to FIG. 3 but showing the deflector in a position intermediate the forward and rearward positions.
Figure 5:
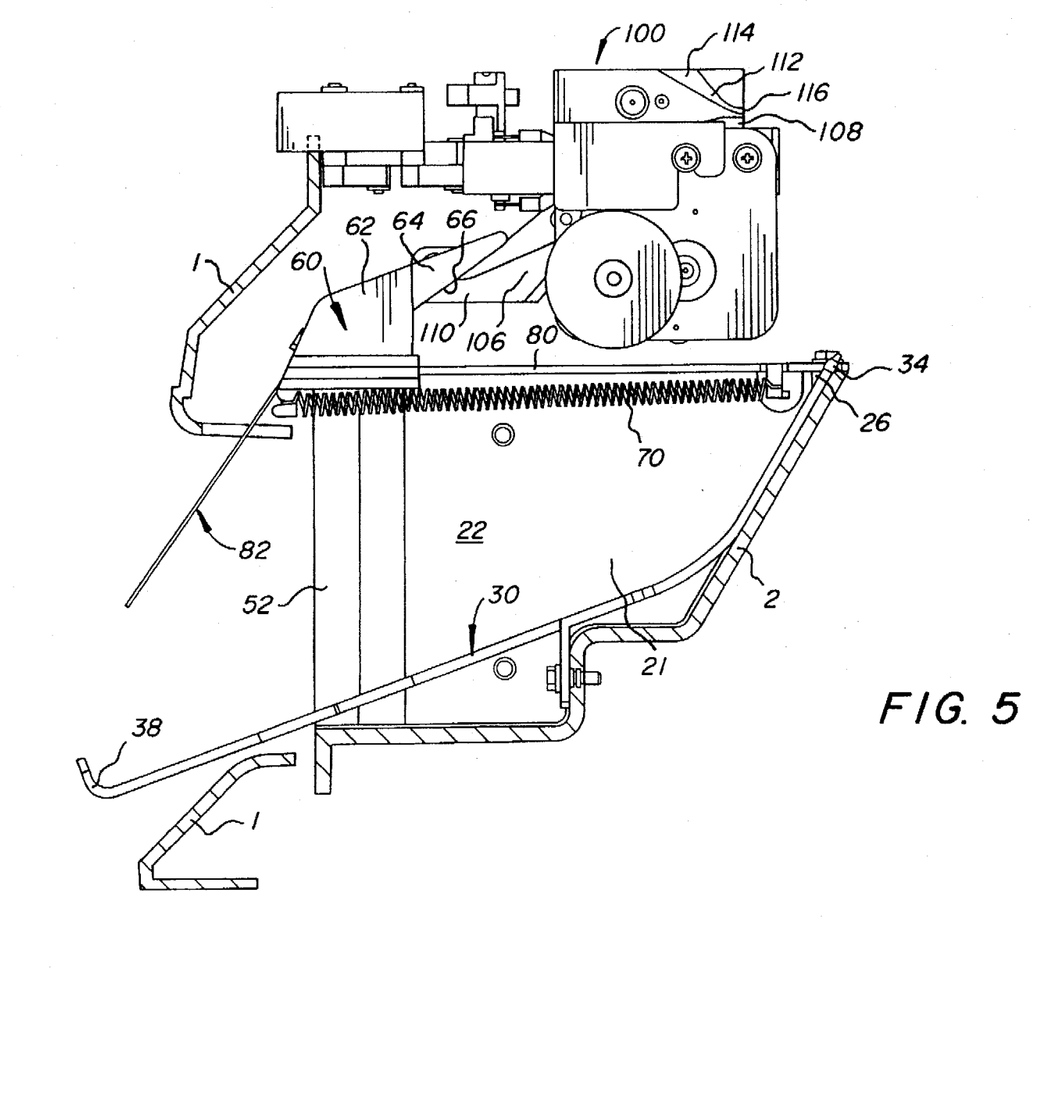
FIG. 5 is a view similar to FIG. 3 but showing the deflector in a rearward position.

Filmstrip 2 of FIG. 1A has a transverse positive curve, that is it is transversely concave in an upward direction as it would be fed into the take-up chamber as described below. The filmstrip of FIG. 1B also has a transverse curve, but transverse negative (that is, it is upwardly convex). FIG. 1C illustrates two filmstrips spliced together by splice 12 to form a single filmstrip. FIGS. 1D and 1E illustrate filmstrips 2 with longitudinal negative curve (that is, longitundinally upward convex), and longitudinal positive curve (that is, longitudinally upward concave). Any of the foregoing types of filmstrips may be encountered by a scanner apparatus and hence, a filmstrip receiving apparatus which receives scanned filmstrips from such a scanner apparatus.

Referring now to the filmstrip receiving apparatus generally designated by reference numeral 19, this is best shown in FIGS. 2–6. Apparatus 19 has a housing 20 which defines a stationary exit chamber 21 between two opposed side walls 22 and a transverse wall 24 extending between side walls 22. Side walls 22 are spaced apart a sufficient distance to accomodate the width of a filmstrip 2, for example about 10% greater than the width of a typical filmstrip 2. Transverse wall 24 extends from an upper front end 26 of chamber 21 to a lower rear end 28 of chamber 21. Housing 20 also has a rear opening 52, and an upper opening 50 defined by a plane between inward edges of two ears 40 connected to, and forming part of, housing 20.

A deflector 60 is mounted within upper opening 50 and extends across it. Delfector 60 has a main body portion 62 with a vertical front face 63. Deflector 60 also includes two grooves 68 which slidably engage on respective ears 40 of housing 20 such that deflector 60 can reciprocate between a forward position shown in FIG. 3 and a rearward position shown in FIGS. 2 and 5 (an intermediate position being shown in FIG. 4). However, deflector 60 is normally urged into the forward position by virtue of two resilient means in the form of springs 70, connected between deflector 60 and housing 20. By virtue of such reciprocating motion, deflector 60 defines between it and front end 26 of upper opening 50, a filmstrip passage 80 of variable length. A filmstrip such as a filmstrip 2 can lengthwise pass downardly through filmstrip passage 80 into chamber 21.

Deflector 60 extends upward and forward of filmstrip passage 80 by virtue of a front surface 66 of forward section 64 sloping upward and forward. This construction is such that when a leading edge of a filmstrip is urged against a front end of deflector 60 (specifically against front surface 66), as the filmstrip is being fed lengthwise downward toward filmstrip passage 80, deflector 60 (particularly surface 66) will direct the filmstrip toward filmstrip passage 80. An elongated thin tongue 82, which is resilient in the forward and backward directions, extends down from the main body portion 62 of deflector 60.

Referring back to housing 20, part of transverse wall 24 includes a guide member 30 connected to the remainder of the wall through an ear 31. Guide member 30 has a front portion 32 which extends downward and rearward from adjacent a front end of filmstrip passage 80, by vitue of a front portion 32 of member 30 first extending straight downward, then extending curvedly downward and rearward to a contiguous rear portion 36. Rear portion 36 extends straight rearward past rear opening 52 of housing 20 to terminate in an enlarged width section 37. Section 37 includes two upturned flanges 38, and a recess 39 which is wide enough to accomodate a thumb and forefinger of a typical user. It will be noted that a front end 34 of member 30 extends upward and forward of filmstrip passage 80, while tapering in thickness before terminating.

Filmstrip receiving apparatus 19 also includes a diverter 100 for guiding a filmstrip downwardly through filmstrip passage 80 into exit chamber 21. Diverter 100 has a frame 101 which includes two opposed sides 102. Frame 101 is typically mounted on a translation stage 280 of a scanner apparatus (see below) so that diverter 100 can reciprocate between a forward position shown in FIG. 3 and a rearward position shown in FIGS. 2 and 5 (an intermediate position being shown in FIG. 4). Diverter 100 has a filmstrip exit guide defined by opposed exit channels 106 in sides 102. Channels 106 (and thus the exit guide) extend downward and rearward from respective inlet openings 108 (together defining an inlet opening of the exit guide) to respective outlet openings 110 (together defining an outlet opening of the exit guide). Exit guide channels 106 are dimensioned and positioned to receive only edge sections 5 of a filmstrip 2 and guide the filmstrip downward and rearward without the image area of a transversely flat, or even a transversely curled, film contacting any other part of diverter 100, including the remainder of frame 101, other than intermittent contact with a kicker roller 118 (described below).

Diverter 100 further includes a filmstrip input guide defined by two opposed input channels 112 in respective sides 102. Channels 112 (and hence, the filmstrip input guide) extend downward and forward from respective inlet openings 114 (together defining an inlet opening of the input guide) to respective outlet openings 116 (together defining an outlet opening of the input guide). Outlet opening 116, as can be seen from the drawings, are positioned above and adjacent the inlet openings 108 (defining an inlet opening of the exit guide). As a result of the foregoing arrangment, when a track to accomodate a filmstrip is aligned with inlet openings 108 of exit guide channels 106, a filmstrip can be fed lengthwise forwardly through input guide channels 112 onto the track, then fed rearwardly to enter exit channel inlet openings 108 and hence the exit guide.

Frame 101 of diverter 100 also has opposed arms 104 which abut respective ears 69 on deflector 60. As a result of this arrangement and the fact that springs 70 normally urge deflector 60 into the forward position, it will be appreciated that diverter 100 will reciprocate between forward and rearward positions in unison with deflector 60, as seen particularly in FIGS. 3–5. During such reciprocating motion it will be seen that outlet openings 110 (which define an outlet opening of the exit guide) maintain their relative position forward of deflector 60 and above filmstrip passage 80. It will be appreciated then, that whether diverter 100 and deflector 60 are in their forward or rearward positions, filmstrip travelling from exit channel inlet 108 to outlets 110, will always be directed downward toward filmstrip passage 80.

Figure 6:
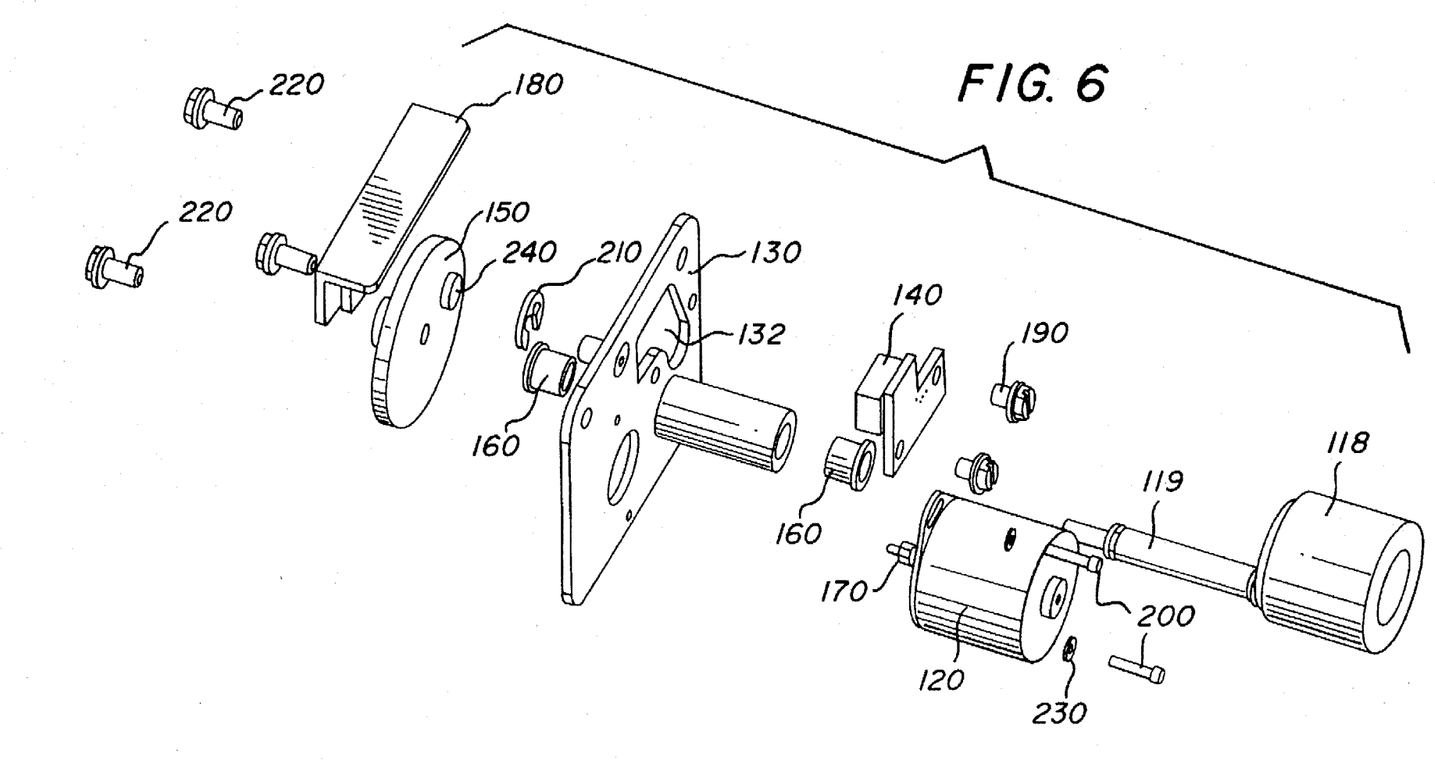
FIG. 6 is a perspective exploded view of a kicker mechanism of the apparatus of FIG. 2.

Diverter 100 further includes a kicker mechanism shown in exploded view in FIG. 6. The kicker mechanism includes an eccentrically mounted (that is, off axis) kicker roller 118. Roller 118 is driven through shaft 119 which extends through bushings 160, mounting plate 130 and e-ring 210 to connect with a large spur gear 150. Large spur gear 150 carries a magnet near its periphery. A driver, in the form of electric motor 120, is mounted on plate 130 by means of screws 200 and washers 230 such that a small spur gear 170 on the shaft of motor 120, meshes with large spur gear 150. A cover 180 is secured to plate 130 by means of screws 220. Additionally, a Hall Effect sensor 140 protrudes through opening 132 in plate 130, and is secured to plate 130 by screws 190. Normally kicker roller 118 is in a rest position where it does not intersect a surface extending between exit guide channels 106 (that is, so it does not normally contact the image area of a film passing through the exit guide), but can be rotated through such a position.

Most of apparatus 19 (excluding, of course, kicker roller and its associated drive train), can be made of suitable rigid plastics. Kicker roller 118 preferably has a surface made of a high frictional material such as a high density urethane foam, for example a foam made by Rogers Corporation, Connecticut under the identification Endur-C 250-25. However, for smooth reciprocating motion of deflector 60, ears 40 are preferably made of metal. Further, all of guide member 30 is preferably made of a polished metal (such as a polished chrome finish) so as to minimize friction, and hence rubbing action against, a filmstrip).

Figure 7:
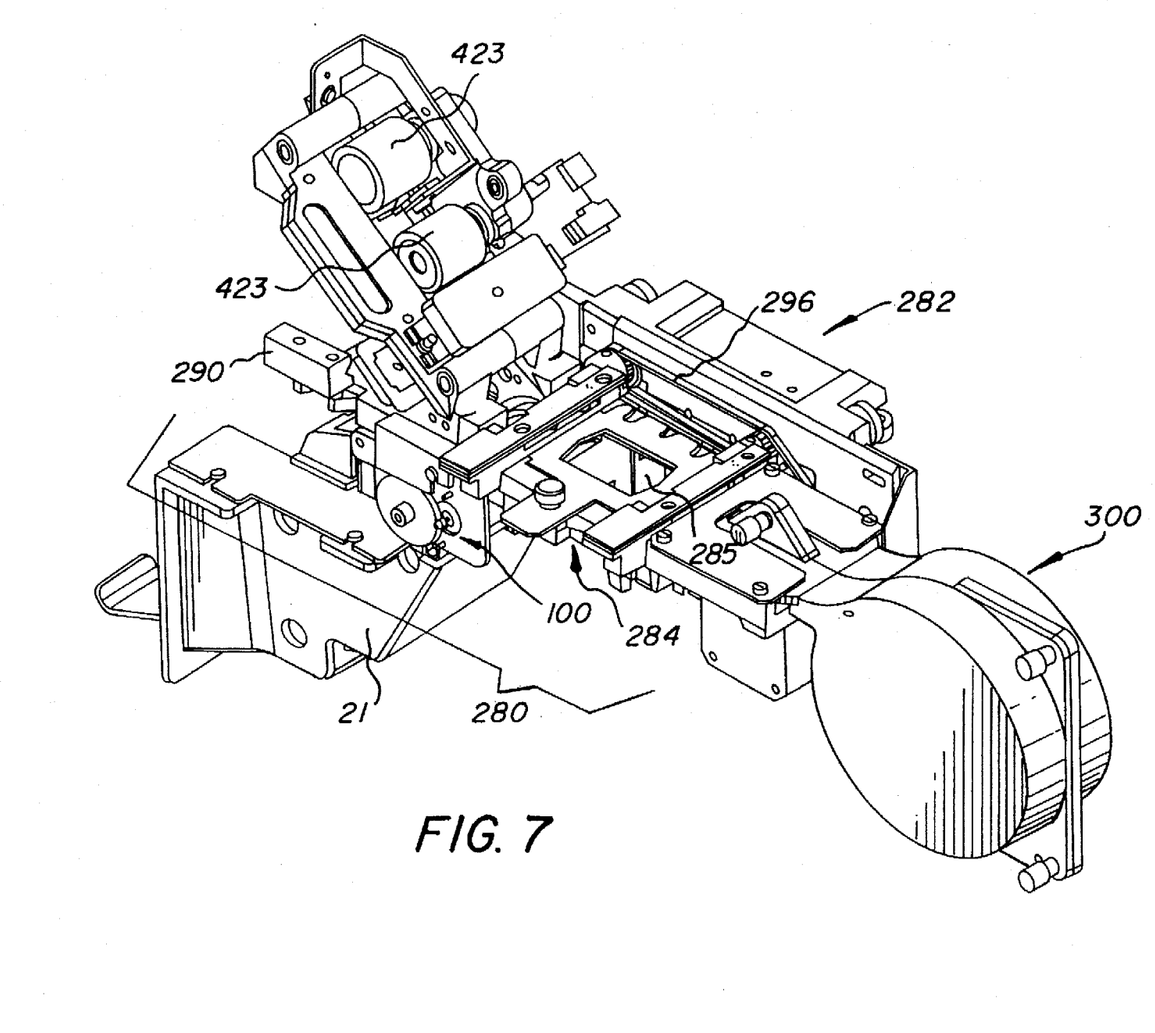
FIG. 7 is a perspective view of a translation stage of a scanner apparatus with the receiving apparatus of FIG. 2 in position thereon.
Figure 8:
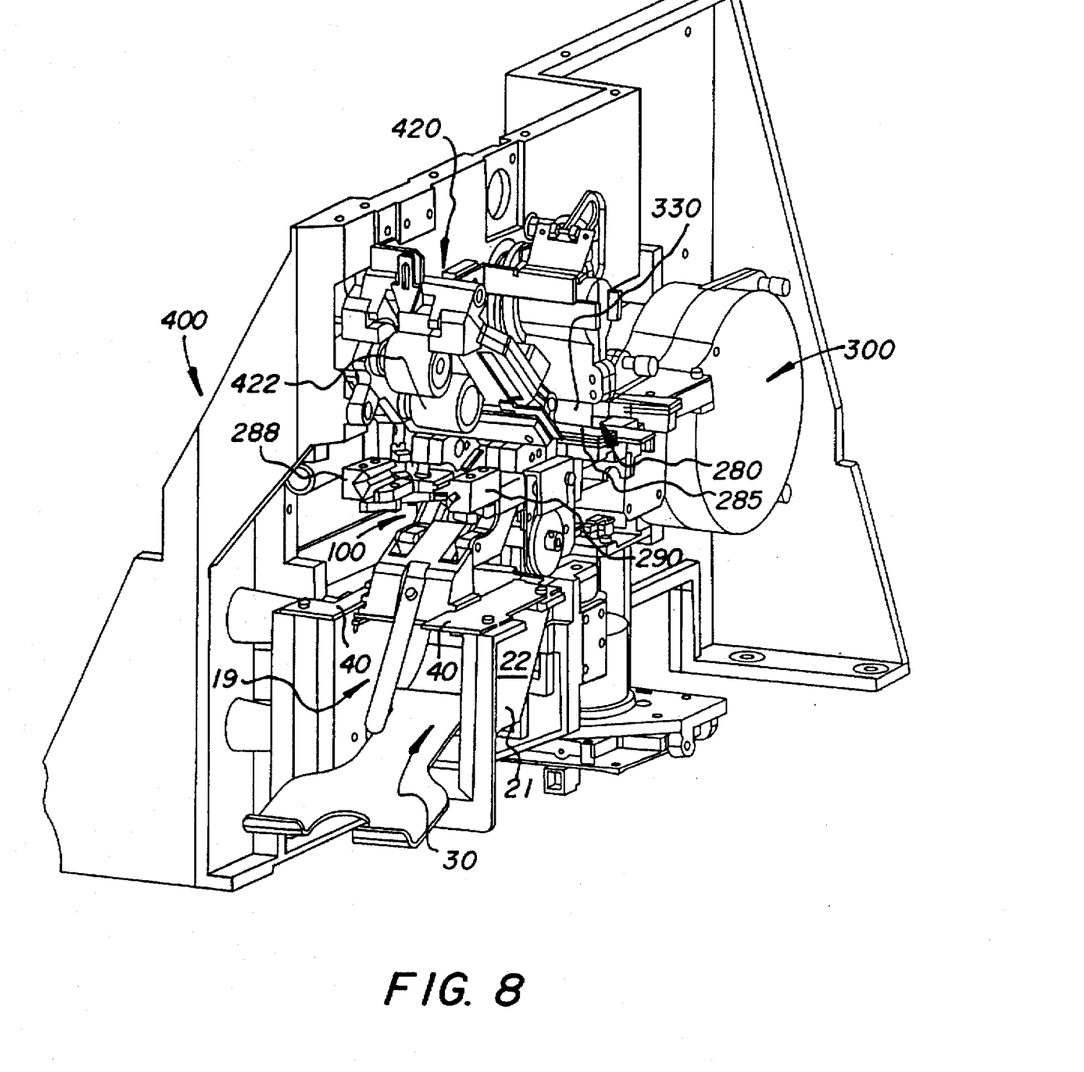
FIG. 8 is a perspective view of a scanner apparatus showing a scanner apparatus of the present invention which includes a filmstrip receiving apparatus of the present invention.

A filmstrip receving apparatus of FIGS. 2–6 will be used as part of a scanner apparatus in the manner illustrated in FIGS. 7 and 8. Such use and operation will now be described with reference to a filmstrip such as a filmstrip of FIG. 1A to 1E. However, it will be appreciated that the receiving apparatus could have application in another scanner apparatus and with filmstrips other than a filmstrip such as a filmstrip 2 (for example, a filmstrip like filmstrip 2 but without perforations 6 in edge sections 5).

In particular, FIG. 7 shows diverter 100 on a portion of a scanner apparatus used for scanning image frames of a filmstrip. This portion of the scanner apparatus, and the overall scanner apparatus 400 in which it is incorporated, are shown in FIG. 8 along with the stationary exit chamber 21 and associated components of the filmstrip receiving apparatus of FIGS. 2–6. The same type of scanner apparatus is shown and described in allowed U.S. patent application Ser. No. 08/197,777, now U.S. Pat. No. 5,465,134, (but with a different take-up chamber, diverter and stationary exit chamber for receiving scanned filmstrip), as well as in U.S. patent application entitled "FILMSTRIP TAKE-UP CHAMBER" by Robert Jones and Douglas Pfaff, filed on the same date as the present application Ser. No. 08/616,610.

In FIG. 7, diverter 100 is depicted mounted in the filmstrip transport path (sometimes referenced as a guide channel or track) of a filmstrip translation stage and scanning gate frame 280 for movement with frame 280 during line-by-line scanning of an image frame of a filmstrip (such as a filmstrip 2). All of the components depicted in FIG. 7, other than the stationary exit chamber 21, are fixed for movement together, so that the driven carriage 282 can provide the above described translation movement during high resolution line-by-line scanning of the image frame in the scanning aperture.

The scanning gate frame 280 supports left and right side slide scanning gate adjusting links 288, 290 attached at the left end thereof. Links 288, 290 can be used to support the moveable jaws of an additional slide scanning gate (not shown). A negative filmstrip such as a filmstrip 2, is directed into the film clamp and scanning gate assembly 284 by two pairs of pinch rollers (each pair having one roller 422 and another roller 423, only one of each pair being visible in FIG. 7 and another one of each pair being visible in FIG. 8) of a film transport assembly 420. Rollers 422, 423 direct the film through inlet openings 114 of inlet channel 112 and out the outlet openings 116 thereof into the guide channel of filmstrip translation stage and scanning gate frame 280. Inlet openings 108 are aligned to receive film from the guide channel and thus outlet openings 116, being immediately above and adjacent inlet openings 108 as shown, are positioned to feed film into the guide channel.

The details of the film scanner apparatus are not believed to be necessary to the understanding the present invention. However, details of the scanner apparatus, but with a different filmstrip receiving apparatus, but may be found in above-allowed U.S. patent application 08/201,282, now U.S. Pat. No. 5,461,492, entitled "FILM SCANNER WITH IN-LINE DUAL SCANNING GATES" by Robert S. Jones.

A filmstrip take-up chamber 300 is attached at the other side of the film clamp and scanning gate assembly 284. Chamber 300 can receive filmstrip from the guide track and allow it to be withdrawn from the chamber. One type of take-up chamber 300 is described in more detail in the pending U.S. patent application entitled "FILMSTRIP TAKE-UP CHAMBER" Ser. No. 08/616,610 referenced above.

The scanning gate frame 280 is supported by translation carriage 282. Carriage 282 is movable on a track (not shown) under the control of the carriage drive motor (not shown) to either reposition the slide scanning gate or the film clamp and scanning gate assembly 284 into the scanning position. The take-up chamber 300 is only used in the scanning of elongated filmstrips having two or more image frames.

As shown in FIG. 12, scanning gate assembly 284 is positioned such that during scanning, its scanning aperture 285 is positioned beneath a light source 330 and above a CCD sensor (not shown).

Assuming that a negative filmstrip such as a filmstrip 2, is to be scanned, carriage 282 translates until the film clamp and scanning gate assembly 284 are positioned in the scanning station and the film clamp is released to allow the filmstrip to be advanced past the scanning aperture 285. The negative filmstrip leading end is advanced from above by two pairs of pinch rollers 422 423 in transport assembly 420, through inlet openings 114 of inlet channels 112 and out the outlet openings 116 thereof into the guide channel of filmstrip translation stage and scanning gate frame 280. The filmstrip is then directed into the nip of a first drive roller assembly (obscured by other components) in filmstrip translation stage and scanning gate frame 280. The first drive roller assembly is driven by a film transport motor (not shown) in carriage 282 at the left side of the film clamp and scanning gate assembly 284, through the drive belt 296. The filmstrip is then advanced to the right through the scanning aperture 285 by the first drive roller assembly and into the nip of a second drive roller assembly on the other side of the scanning aperture that is also driven through drive belt 296.

The filmstrip leading end is continuously driven at relatively high speed through scanning aperture 285 and beneath light source 330 by the first and second drive roller assemblies, and a low resolution pre-scan operation is conducted as described above and in the above-referenced co-pending applications. The CCD and associated eletronic components (not shown) derive a first set of image data for each scanned image frame. At the same time, position data is derived by sprocket hole perforation sensors for use in the detection of drive slippage or jamming and the correct positioning of the image frames during the high resolution main-scan operation of the image frames in the reverse direction. As this proceeds, the filmstrip is loaded into the attached take-up chamber 300, until the last image frame is pre-scanned. Rotation of the drive roller assemblies through drive belt 296 is halted with the trailing end of the filmstrip engaged in the nip of the right side drive roller assembly.

After all image frames are pre-scanned, rotation of the drive roller assemblies is reversed, and the filmstrip is driven to the left until an image frame is positioned in the scanning aperture 285, beneath light source 330 and above the CCD sensor, using the positioning data accumulated in the pre-scan. Once the filmstrip image frame is positioned for scanning, the drive belt 296 is halted and the film clamp is engaged. The carriage 282 is then incrementally driven to translate the clamped film image frame past the stationary scanning components (light source 330 and CCD sensor) to derive a second set of image data in the form of high resolution main-scan image data. During that translation and scanning, the negative filmstrip is itself motionless in scanning gate 284, and the image frames to be withdrawn and scanned next are motionless inside the take-up chamber 20. The process is repeated to complete the main-scan of each image frame.

After completion of the main-scanning of several image frames, drive belt 296 has driven the filmstrip to the left sufficiently far that it enters inlet openings 108 of exit channels 106. After entering exit channels 106, the filmstrip remains motionless in channels 106 during translation of translation stage and scanning gate frame 280, and only again moves downward and rearward in channels 106 when drive belt 296 advances the filmstrip to the left for main-scanning of the next image frame. As the filmstrip passes through exit channels 106 it will be appreciated that only edge sections 5 normally contact the diverter 100 (by virtue of being guided by exit channels 106), as kicker roller 118 is in the rest position at this time. This is true even for films that may have some positive transverse curl (see FIG. 1A) in particular.

Depending on the length of the filmstrip being scanned, either during main-scanning or completion of it, a leading edge of the filmstrip will eventually be advanced by drive belt 296 through outlets 110 of exit channels 106 into filmstrip passage 80. At this point it will be noticed that if the filmstrip should have a longitudinal positive curl (see FIG. 1E), the leading edge so advanced may abut deflector 60 rather than going straight into filmstrip passage 80. In this regard, the upward and forward sloping front surface 66 together with vertical front face 63 of deflector 60, help direct film urged against a front end of the deflector downward toward filmstrip passage 80. The front end 34 of guide member 30, extending upward and forward (while also tapering in thickness) also helps direct a filmstrip through filmstrip passage 80. Even if the filmstrip still has frames which are being main-scanned while its leading edge extends past filmstrip passage 80, due to the reciprocating motion of diverter 100 in unison with deflector 60 (by virtue of contact of arms 104 with ears 69, and springs 70), the image area of the filmstrip will not suffer substantial rubbing against housing 20, deflector 60, or their components.

When the last image frame is main-scanned, this is detected by detectors in scanner apparatus 400 and a signal is sent to activate motor 120. This causes kicker roller 118 to complete 4 revolutions in a counterclockwise direction as viewed in FIGS. 3–5, from its normal rest position out of contact with a filmstrip in exit channels 106, to come into contact with the filmstrip between its edges 4 (in particular, in the image area 8). This motion urges the filmstrip downward and rearward in exit channels 106, such that the trailing edge of the filmstrip will clear filmstrip passage 80 (that is, all the filmstrip will now be in exit chamber 21). Magnet 240 which is normally aligned with Hall Effect sensor 140 in the rest position of kicker roller 118, will also be rotated in unison with roller 118. When magnet 240 is again aligned with sensor 140, a signal is generated from sensor 140 which, with suitable circuitry (not shown), causes motor 120 to be de-energized after the four revolutions. Thus, kicker roller 118 completes four revolutions (although it is possible to arrange for roller 118 to complete a lesser or greater number of revolutions if desired).

While the leading edge of a filmstrip is entering exit chamber 21 through filmstrip passage 80, it will contact front portion 32 of guide member 30. The shape of guide member 30, as previously described, and the low friction polished metal surface of guide member 30, will help direct the leading edge and the remainder of the filmstrip, downward and rearward. In the case of a film with no curl, the leading edge will be stopped by upturned flanges 38, thereby retaining a completely scanned filmstrip in stationary exit chamber 21 for easy retrieval by a user by using the thumb and forefinger in recess 39. In the case of a filmstrip that has positive or negative longitudinal curl, such a filmstrip, as it is advanced down into chamber 21, will eventually tend to abut tongue 82. Due to the downard and rearward slope of tongue 82, it will cause such film to curl within chamber 21 while sitting on guide member 30. Such a curled filmstrip can also readily be retrieved by a user through open rear opening 52.

The preceding examples are set forth to illustrate specific embodiments of this invention and are not intended to limit the scope of the invention. It will be understood that variations and modifications can be effected within the spirit and scope of the invention.

Parts List 2 filmstrips
4 Longitudinal Edges
5 Edge Sections
6 Perforations
8 Image Area
10 Image Frames
12 Splice
19 Filmstrip Receiving Apparatus
20 Housing
21 Stationary Exit Chamber
22 Side Walls
24 Transverse Wall
26 Upper Front End
28 Lower Rear End
30 Guide Member
31 Ear
32 Front Portion
34 Front End
36 Rear Portion
37 Enlarged Width Section
38 Flanges
39 Recess
40 Ears
50 Upper Opening
52 Rear Opening
60 Deflector
62 Main Body Portion
63 Vertical Front Face
64 Forward Section
66 Front Surface
68 Grooves
69 Ears
70 Springs
80 Filmstrip Passage
82 Tongue
100 Diverter
101 Frame
102 Sides
104 Arms
106 Exit Guide Channels
108 Exit Channel Inlets
110 Outlet Openings
112 Input Guide Channels
114 Inlet Openings
116 Outlet Openings
118 Kicker Roller
119 Shaft
120 Electric Motor
130 Mounting Plate
132 Opening
140 Hall Effect Sensor
150 Large Spur Gear
160 Bushings
170 Small Spur Gear
180 Cover
190 Screws
200 Screws
210 E-Ring
220 Screws
230 Washers
240 Magnet
280 Filmstrip Translation Stage and Scanning Gate Frame
282 Translation Carriage
284 Film Clamp And Scanning Gate Assembly
285 Scanning Aperture
288 Links
290 Links
296 Drive Belt
300 Filmstrip Take-Up Chamber
330 Light Source
400 Scanner Apparatus
420 Film Transport Assembly
422 Pinch Rollers
423 Pinch Rollers

We claim:

1. Filmstrip receiving apparatus for receiving an elongated filmstrip, comprising:

a) a housing defining a stationary exit chamber to receive the filmstrip therein, the housing having: two opposed side walls spaced apart to accommodate the width of the filmstrip; a transverse wall extending between the side walls from an upper front end of the chamber to a lower rear end of the chamber; and an upper opening and a rear opening;

b) a deflector mounted to reciprocate between forward and backward positions within the upper opening to define between said deflector and a front end of the upper opening, a filmstrip passage of variable length through which a filmstrip can lengthwise pass downwardly into the exit chamber.

2. An apparatus according to claim 1 additionally comprising resilient means for urging the deflector into the forward position.

3. An apparatus according to claim 1 wherein said deflector extends upward and forward of the filmstrip passage so that when a leading edge of the filmstrip is urged against a front end of the deflector as the filmstrip is being fed lengthwise downward toward the filmstrip passage, said deflector directs the filmstrip toward the filmstrip passage.

4. An apparatus according to claim 1 additionally comprising a diverter for guiding a filmstrip downwardly through the filmstrip passage into the exit chamber, comprising a frame having two opposed sides and a filmstrip exit guide between them which extends downward and rearward from an inlet opening which can receive the filmstrip, to an outlet opening, the diverter being reciprocable between forward and rearward positions in unison with the deflector during which the outlet opening of the exit guide maintains its relative position forward of the deflector and above the filmstrip passage so that filmstrip is directed downwardly toward the filmstrip passage during reciprocating motion of the deflector and diverter frame.

5. An apparatus according to claim 4 wherein the filmstrip exit guide comprises opposed channels in the sides to receive and guide respective edges of the filmstrip.

6. An apparatus according to claim 4 wherein the diverter additionally comprises a roller to intermittently contact a filmstrip traveling in the guide between its edges, and urge the filmstrip downward and rearward, and a driver to rotate the roller.

7. An apparatus according to claim 6 wherein the roller is mounted off axis so as to normally be out of contact with a filmstrip traveling in the exit guide.

8. An apparatus according to claim 4 wherein the diverter has a filmstrip input guide between the sides which extends downwardly and forwardly from an inlet opening to an outlet opening positioned above and adjacent the inlet opening of the exit guide, so that the filmstrip can be move forwardly through the input guide onto a track aligned with the exit guide, then move rearwardly into the exit guide.

9. An apparatus according to claim 1 wherein the transverse wall includes a guide member which extends downward and rearward from adjacent a front end of the filmstrip passage, then straight rearward to at least the rear opening of the housing, so as to guide the filmstrip entering the filmstrip passage downward and rearward.

10. An apparatus according to claim 9 wherein a front end of the guide member extends upward and forward of the front end of the filmstrip passage.

11. An apparatus according to claim 1 additionally comprising a tongue extending downward and rearward from the deflector at least part way toward the transverse wall, to direct lengthwise curled film urged against it from below, in a forward direction.

12. A scanner apparatus for scanning image frames of a filmstrip advanced into a scanning station, comprising:
   a) a scanner in the scanning station to scan the image frames of the filmstrip and derive image data related to the scanned image frame;
   b) a filmstrip receiving apparatus for receiving the filmstrip following scanning, comprising:
      i) a housing defining a stationary exit chamber to receive the filmstrip therein, the housing having: two opposed side walls spaced apart to accommodate the width of the filmstrip; a transverse wall extending between the side walls from an upper front end of the chamber to a lower rear end of the chamber; and an upper opening and a rear opening;
      ii) a deflector mounted to reciprocate between forward and backward positions within the upper opening to define between said deflector and a front end of the upper opening, a filmstrip passage of variable length through which a scanned filmstrip can lengthwise pass downwardly into the exit chamber.

13. A scanner apparatus according to claim 12 wherein the deflector extends upward and forward of the filmstrip passage so that when a leading edge of the filmstrip is urged against a front end of the deflector as the filmstrip is being fed lengthwise downward toward the filmstrip passage, said deflector directs the filmstrip toward the filmstrip passage.

14. A scanner apparatus according to claim 12 additionally comprising a diverter for guiding a filmstrip from the scanner downward through the filmstrip passage and into the exit chamber, comprising a frame having two opposed sides and a filmstrip exit guide between them which extends downward and rearward from an inlet opening positioned to receive a scanned filmstrip from the scanner, to an outlet opening, the diverter being reciprocable between forward and rearward positions in unison with the deflector during which the outlet opening of the exit guide maintains its relative position forward of the deflector and above the filmstrip passage so that filmstrip is directed downwardly toward the filmstrip passage during reciprocating motion of the deflector and diverter frame.

15. A scanner apparatus according to claim 14 wherein the filmstrip exit guide comprises opposed channels in the sides to receive and guide respective edges of the filmstrip.

16. An apparatus according to claim 14 wherein the transverse wall includes a guide member which extends downward and rearward from adjacent a front end of the filmstrip passage, then straight rearward to at least the rear opening of the housing, so as to guide the filmstrip entering the filmstrip passage downward and rearward.

* * * * *